(12) United States Patent
Kang et al.

(10) Patent No.: US 7,243,504 B2
(45) Date of Patent: Jul. 17, 2007

(54) COGENERATION SYSTEM

(75) Inventors: Seung Tak Kang, Seoul (KR); Chang Min Choi, Seoul-si (KR); Won Jae Choi, Seoul (KR); Hyung Soo Lim, Seoul (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 11/046,756

(22) Filed: Feb. 1, 2005

(65) Prior Publication Data
US 2006/0037345 A1 Feb. 23, 2006

(30) Foreign Application Priority Data
Aug. 17, 2004 (KR) ............... 10-2004-0064810

(51) Int. Cl.
*F25B 27/02* (2006.01)
(52) U.S. Cl. .......... 62/238.7; 62/323.1; 62/324.6
(58) Field of Classification Search .... 62/238.6–238.7, 62/323.1, 324.1, 324.6
See application file for complete search history.

(56) References Cited

U.S. PATENT DOCUMENTS

| | | | | |
|---|---|---|---|---|
| 4,492,008 A | * | 1/1985 | Anantha et al. | 438/327 |
| 4,614,090 A | * | 9/1986 | Kaneko et al. | 62/158 |
| 4,697,434 A | * | 10/1987 | Yuyama | 62/238.7 |
| 5,878,810 A | * | 3/1999 | Saito et al. | 165/240 |
| 6,425,257 B1 | * | 7/2002 | Ohseki et al. | 62/323.1 |
| 6,769,481 B2 | * | 8/2004 | Yoshimura et al. | 165/240 |

* cited by examiner

*Primary Examiner*—William E. Tapolcai
(74) *Attorney, Agent, or Firm*—Birch, Stewart, Kolasch & Birch, LLP

(57) ABSTRACT

A cogeneration system including an engine, which drives a generator to generate electricity, a cooling/heating unit using a heat pump type refrigerant cycle, in which a refrigerant is circulated through at least one compressor, a four-way valve, a first outdoor heat exchanger, a first expansion device, and an indoor heat exchanger, in this order, during a cooling operation of the cogeneration system, and a waste heat consuming heating unit using a refrigerant cycle, in which the refrigerant is circulated through the compressor, the four-way valve, the indoor heat exchanger, a second expansion device, and a second outdoor heat exchanger to be heated by waste heat of the engine, in this order, during a heating operation of the cogeneration system. In accordance with the cogeneration system, it is possible to maximize utilization of engine waste heat during the heating operation and to achieve an enhancement in heating performance.

22 Claims, 4 Drawing Sheets

COGENERATION SYSTEM

BACKGROUND OF THE INVENTION

1. Field of the Invention

The present invention relates to a cogeneration system in which both the electricity and waste heat generated from an engine are used, and, more particularly, to a cogeneration system which includes a separate outdoor heat exchanger to be heated by waste heat of an engine during a heating operation, thereby achieving an enhancement in heating performance.

2. Description of the Related Art

In general, cogeneration systems are adapted to generate both electricity and heat from a single energy source.

Such a cogeneration system can recover heat of exhaust gas or waste heat of cooling water generated from an engine or turbine during an electricity generation operation, so that the cogeneration system can achieve an increase in energy efficiency of 70 to 80% over other systems. By virtue of such an advantage, the cogeneration system has recently been highlighted as an electricity and heat supply source for buildings. In particular, the cogeneration system exhibits highly-efficient energy utilization in that the recovered waste heat is mainly used to heat/cool a confined space and to heat water.

FIG. 1 is a schematic configuration diagram illustrating a conventional cogeneration system.

As shown in FIG. 1, the conventional cogeneration system includes a gas engine 1, and a generator 3, which is driven by a driving force outputted from the gas engine 1, to generate electricity. The electricity generated from the generator 3 is used in a variety of devices including a cooling/heating unit 20, illumination devices, and other electrical products.

In the cogeneration system, waste heat generated from the gas engine 1, that is, heat of cooling water generated when the cooling water cools the gas engine 1, and heat of exhaust gas generated from the gas engine 1, is used during a heating operation of the cooling/heating unit 20.

Here, the cooling/heating unit 20 is of a heat pump type so that the cooling/heating unit 20 not only can be used as a cooling unit, but also can be used as a heating unit in a state in which the refrigerant flow direction in the refrigerant cycle is reversed. As in a general heat pump type configuration, the cooling/heating unit 20 includes a compressor 21, a four-way valve 23, an outdoor heat exchanger 25, an outdoor fan 26, an expansion device 27, and an indoor heat exchanger 29.

In particular, an air pre-heating heat exchanger 30 is arranged at the side of the outdoor heat exchanger 25 to preheat air passing around the outdoor heat exchanger 25 during a heating operation of the cooling/heating unit 20, using the waste heat of the gas engine 1.

In order to supply the waste heat to the cooling/heating unit 20, the cogeneration system also includes a cooling water heat exchanger 5 to recover the heat of the cooling water used to cool the gas engine 1, and an exhaust gas heat exchanger 9 arranged at an exhaust conduit 7 to recover the heat of the exhaust gas.

The cooling water heat exchanger 5 and exhaust gas heat exchanger 9 are connected to the air pre-heating heat exchanger 30 of the cooling/heating unit 20 by a heat transfer line 11, through which a heat transfer medium flows, so as to supply waste heat to the air pre-heating heat exchanger 30 during the heating operation of the cooling/heating unit 20. Thus, the cogeneration system recovers engine heat and exhaust gas heat, pre-heats outdoor air through the air pre-heating heat exchanger 30, using the recovered heat, and causes the pre-heated air to perform heat exchange with the outdoor heat exchanger 25, thereby preventing a degradation in the heating performance of the cooling/heating unit 20, which may occur when the temperature of the outdoor air is low.

When the cooling/heating unit 20 operates in a cooling mode, the flow path of the heat transfer medium is changed to communicate with a radiating line 13, which is connected to the heat transfer line 11, because it is unnecessary to supply waste heat. In this case, the waste heat is discharged to the atmosphere through a radiator 17, which includes a heat exchanger 15 and a radiator fan 16, or is supplied to and used in a water heater, a hot water supplier, or other systems.

In FIG. 1, reference character P designates pumps, each serving to force the heat transfer medium to flow through an associated portion of the heat transfer line 11, and reference character V designates valves, each serving to switch the flow path of the heat transfer medium between the heat transfer line 11 and the radiating line 13.

However, since the waste heat generated from the gas engine 1 is used only to pre-heat the outdoor heat exchanger 25 through the air pre-heating heat exchanger 30, the conventional cogeneration system has a limitation in enhancing the heating performance during the heating operation.

SUMMARY OF THE INVENTION

The present invention has been made in view of the above-mentioned problem, and it is an object of the invention to provide a cogeneration system which includes an additional outdoor heat exchanger to be heated by waste heat of an engine during a heating operation, thereby achieving an enhancement in waste heat utilization efficiency and an enhancement in heating performance.

In accordance with one aspect, the present invention provides a cogeneration system comprising: an engine, which drives a generator to generate electricity; a cooling/heating unit comprising a heat pump type refrigerant cycle to circulate a refrigerant through at least one compressor, a four-way valve, a first outdoor heat exchanger, a first expansion device, and an indoor heat exchanger, in this order, during a cooling operation of the cogeneration system; and a waste heat consuming heating unit comprising a refrigerant cycle to circulate the refrigerant through the compressor, the four-way valve, the indoor heat exchanger, a second expansion device, and a second outdoor heat exchanger to be heated by waste heat of the engine, in this order, during a heating operation of the cogeneration system.

The waste heat consuming heating unit may further comprise a heater to heat the refrigerant circulated through the waste heat consuming heating unit, using the electricity generated from the engine.

The waste heat consuming heating unit may further comprise bypass means to cause a part of the refrigerant emerging from the indoor heat exchanger to flow without passing through the second outdoor heat exchanger.

The waste heat consuming heating unit may further comprise a refrigerant line and a valve to guide the refrigerant emerging from the second outdoor heat exchanger to pass through the first outdoor heat exchanger, if necessary.

The cogeneration system may further comprise a cooling water heat exchanger to recover heat of cooling water of the engine, and an exhaust gas heat exchanger to recover heat of exhaust gas of the engine. The second outdoor heat exchanger may receive heat from at least one of the cooling water heat exchanger and the exhaust gas heat exchanger.

The engine, the second outdoor heat exchanger, and the second expansion device may be arranged in an engine room.

The compressor, the four-way valve, the first outdoor heat exchanger, and the first expansion device may be arranged in an outdoor unit.

Each of the compressor, the indoor heat exchanger, the first outdoor heat exchanger, and the second outdoor heat exchanger comprises a plurality of ones, which are combined with the other ones of the compressor, the indoor heat exchanger, the first outdoor heat exchanger, and the second outdoor heat exchanger.

Since the cogeneration system of the present invention includes a separate outdoor heat exchanger to receive waste heat from an engine during a heating operation, it is possible to maximize utilization of engine waste heat during the heating operation and to achieve an enhancement in heating performance.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings.

Figure 1:
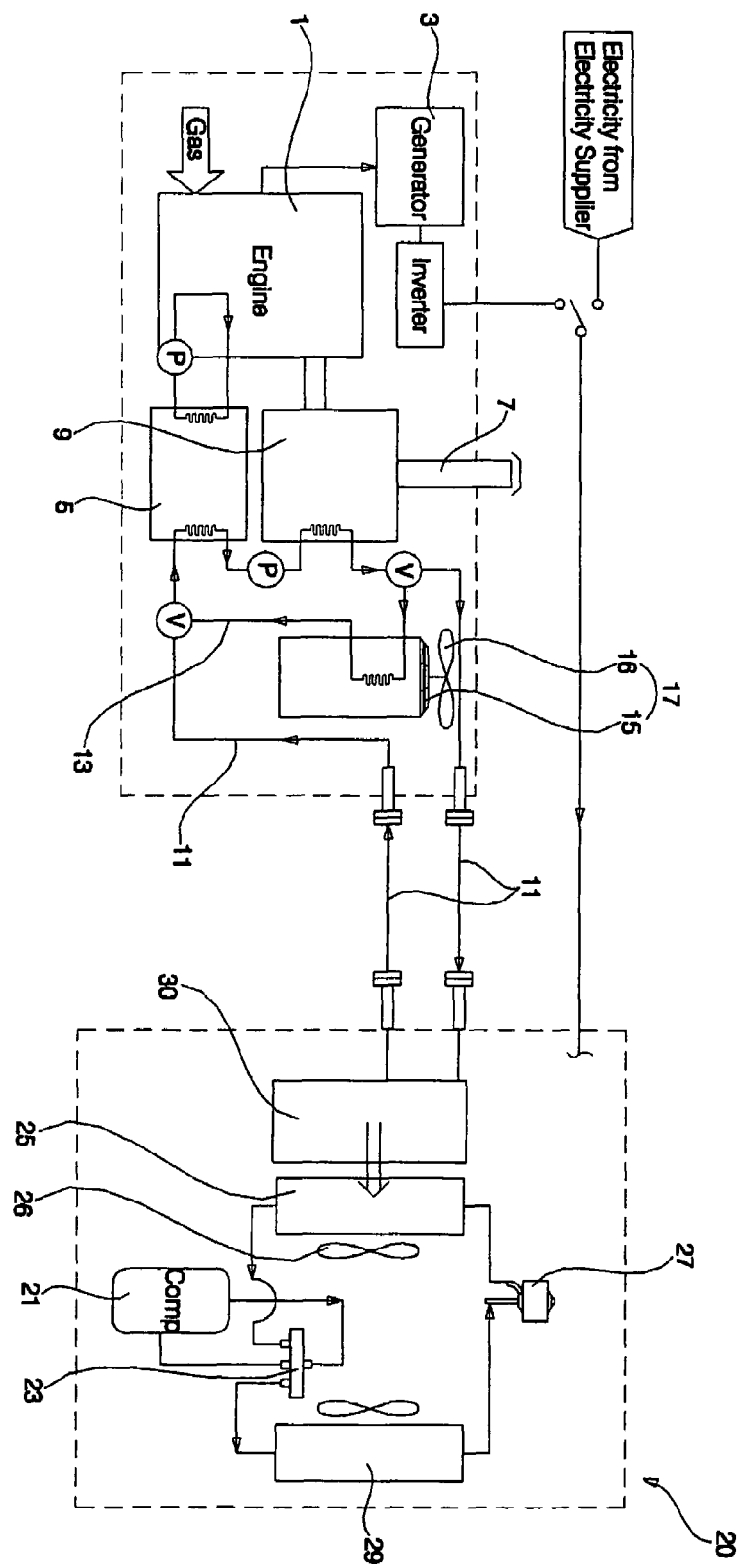
FIG. 1 is a schematic configuration diagram illustrating a conventional cogeneration system.
Figure 2:
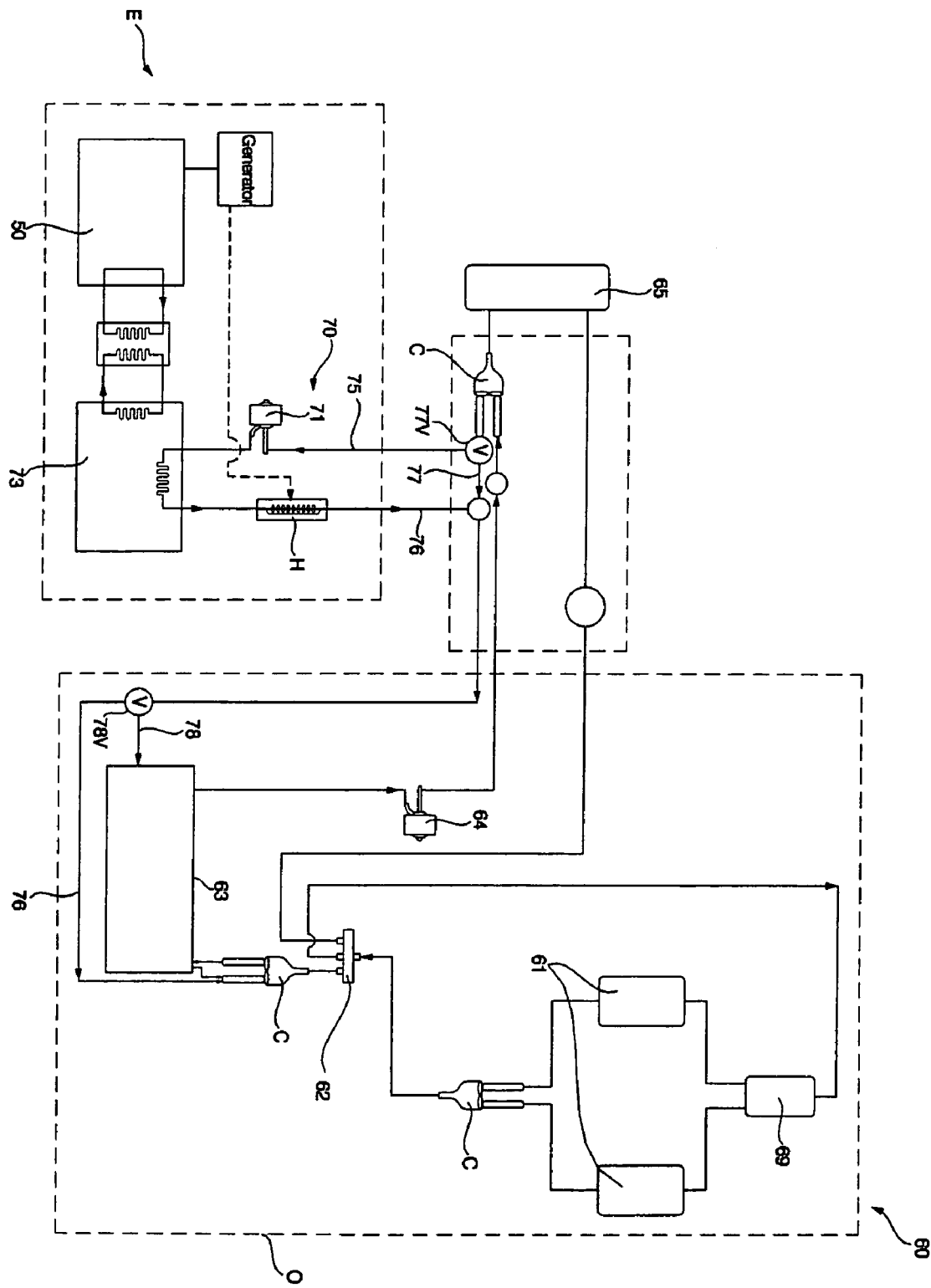
FIG. 2 is a schematic configuration diagram illustrating a cogeneration system according to an exemplary embodiment of the present invention.
Figure 3:
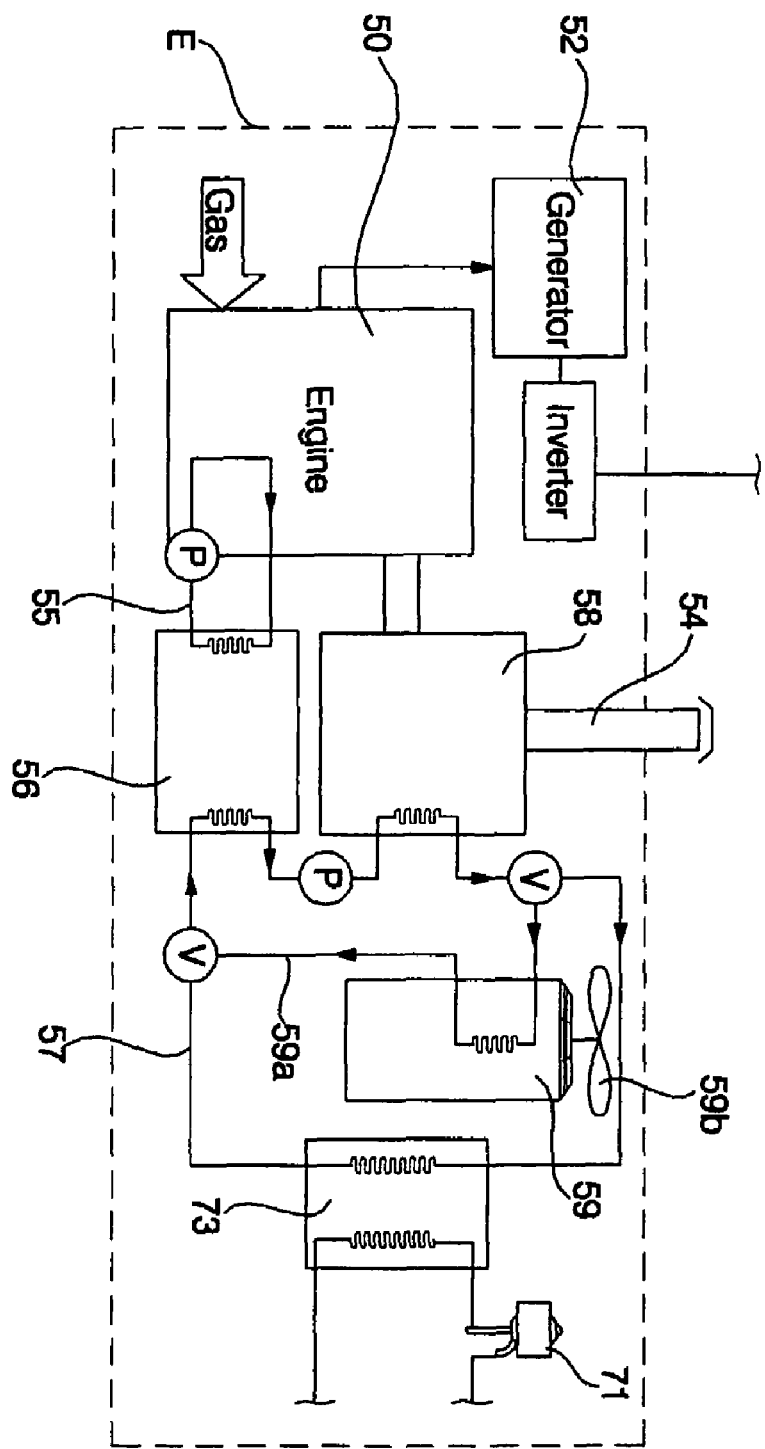
FIG. 3 is a schematic configuration diagram illustrating an engine room included in the cogeneration system.

FIG. 2 is a schematic configuration diagram illustrating a cogeneration system according to an exemplary embodiment of the present invention. FIG. 3 is a schematic configuration diagram illustrating an engine room included in the cogeneration system.

As shown in FIG. 2, the cogeneration system includes an engine 50 to drive a generator 52, and thus, to generate electricity, and a cooling/heating unit 60. The cooling/heating unit 60 uses a heat pump type refrigerant cycle, in which a refrigerant is circulated through at least one compressor 61, a four-way valve 62, a first outdoor heat exchanger 63, a first expansion device 64, and an indoor heat exchanger 65, in this order, during a cooling operation of the cogeneration system. The cogeneration system also includes a waste heat consuming heating unit 70. The waste heat consuming heating unit 70 uses a refrigerant cycle, in which a refrigerant is circulated through the compressor 61, the four-way valve 62, the indoor heat exchanger 65, a second expansion device 71, and a second outdoor heat exchanger 73 to be heated by waste heat of the engine 50, in this order, during a heating operation of the cogeneration system.

The engine 50, second outdoor heat exchanger 73, and second expansion device 71 are arranged in an engine room E.

The engine 50 is driven, using fossil fuel such as natural gas or petroleum gas. The generator 52 supplies electricity to the cooling/heating unit 60 and other systems.

In particular, as an additional arrangement installed in the engine room E to supply the waste heat of the engine 50 to the second outdoor heat exchanger 73 of the waste heat consuming heating unit 70, as shown in FIG. 3, there are a cooling water heat exchanger 56 connected to the engine 50 via a cooling water line 55 to recover heat of cooling water of the engine 50, an exhaust gas heat exchanger 58 arranged at a discharge conduit 54 to recover heat of exhaust gas discharged from the engine 50, and a heat transfer line 57, which extends through the cooling water heat exchanger 56 and exhaust gas heat exchanger 58, and transfers heat absorbed from the cooling water heat exchanger 56 and exhaust gas heat exchanger 58 to the second outdoor heat exchanger 73.

The cogeneration system further includes a radiating heat exchanger 59 to supply the waste heat of the engine 50 to other systems, which require the waste heat, or to radiate the waste heat to the atmosphere when it is unnecessary to transfer the waste heat to the second outdoor heat exchanger 73. To this end, a bypass line 59a, which is branched from the heat transfer line 57, passes through the radiating heat exchanger 59. Valves V are also arranged at the heat transfer line 57 to change the path of a heat transfer medium between the heat transfer line 57 and the bypass line 59a.

A heater H may be arranged at a refrigerant line to heat a refrigerant circulated through the cooling/heating unit 60 and waste heat consuming heating unit 70, using the electricity generated from the generator 52 by the driving force of the engine 50, and thus, to achieve an enhancement in heating performance.

The heater H may be arranged at any appropriate position on the refrigerant line. It is preferred that the heater H be activated, using the electricity of the generator 52 remaining after being used in other electricity-consuming elements, for example, the compressor 61.

In FIG. 3, reference character P designates pumps, each serving to force the heat transfer medium to flow through an associated line, and reference numeral 59b designates a radiator fan.

Meanwhile, the second expansion device 71 and second outdoor heat exchanger 73 are connected, in this order, to a refrigerant line 75 branched from a refrigerant line 76 connected to an outlet of the second outdoor heat exchanger 73. The refrigerant line 76 is connected to the four-way valve 62.

In order to eliminate a heating overload generated at the second expansion device 71 and second outdoor heat exchanger 73 when the refrigerant is circulated through the second expansion device 71 and second outdoor heat exchanger 73 in accordance with the heating operation, the cogeneration system also includes a bypass means to cause a part of the refrigerant emerging from the indoor heat exchanger 65 to flow through the refrigerant line 76 at the outlet side of the second outdoor heat exchanger 73 without passing through the second outdoor heat exchanger 73. The bypass means includes a bypass line 77 connected between an inlet end of the refrigerant line 75 and the outlet side of the second outdoor heat exchanger 73, and a valve 77V to change the refrigerant path between the refrigerant line 76 and the bypass line 77.

In order to guide the refrigerant emerging from the second outdoor heat exchanger 73 to pass through the first outdoor heat exchanger 63, if necessary, when the ambient temperature around the second outdoor heat exchanger 73 is higher than the refrigerant evaporating temperature of the second outdoor heat exchanger 73, the cogeneration system further includes a refrigerant line 78 connected between the refrigerant line 76 and the first outdoor heat exchanger 63, and a valve 78V to change the refrigerant path between the refrigerant line 76 and the refrigerant line 78. In this case, the waste heat consuming heating unit 70 may have a function to determine whether the ambient temperature around the second outdoor heat exchanger 73 is higher than the refrigerant evaporating temperature of the second outdoor heat exchanger 73.

Meanwhile, the compressor 61, four-way valve 62, first outdoor heat exchanger 63, and first expansion device 64 constitute an outdoor unit O, as in a general air conditioner. The indoor heat exchanger 65 is installed in a confined space to be cooled/heated.

Although the present invention has been described in conjunction with the case in which only one indoor heat exchanger 65 is used, a plurality of indoor heat exchangers connected in serial or in parallel to the refrigerant lines may be used. Also, a plurality of outdoor units O each including one compressor 61 and one outdoor heat exchanger 63 may be used in accordance with the given design condition, if necessary.

In FIG. 2, reference character C designates a check valve type distributor to distribute the refrigerant in predetermined directions.

Meanwhile, the above-described heat exchangers may have various heat transfer configurations, for example, a heat transfer configuration in which heat transfer is carried out through a thermal conductor, or a heat transfer configuration in which heat transfer is carried out through a fluid present in a heat exchanger, in accordance with the given design condition or the given requirement.

Figure 4:
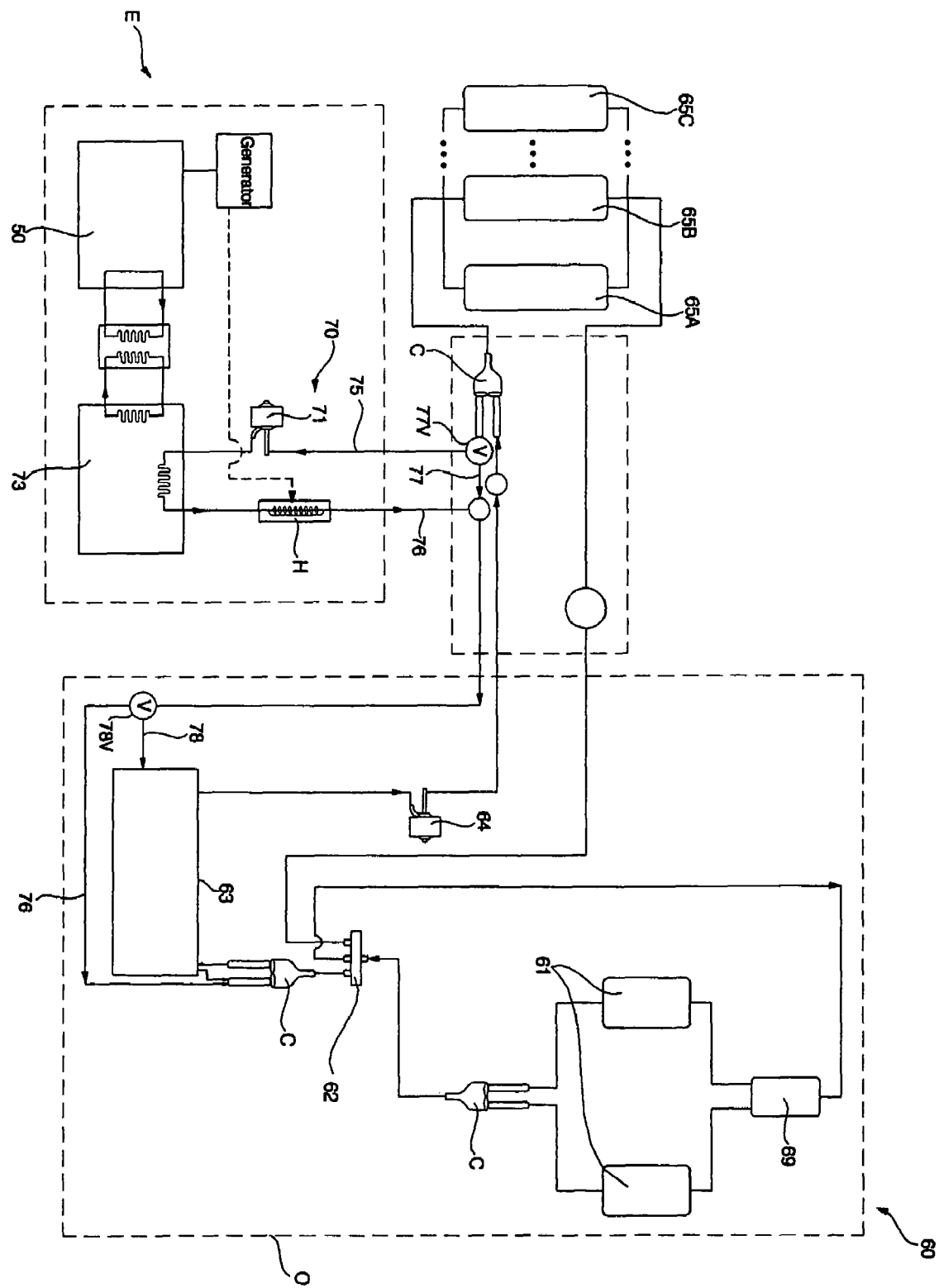
FIG. 4 is a schematic configuration diagram illustrating a cogeneration system according to another exemplary embodiment of the present invention in which a plurality of indoor heat exchangers are used.

FIG. 4 is a schematic configuration diagram illustrating a cogeneration system according to another exemplary embodiment of the present invention in which a plurality of indoor heat exchangers are used. In this case, a plurality of indoor heat exchangers 65A, 65B, and 65C are arranged in serial or parallel in a single cooling/heating unit 60 to cool/heat a plurality of confined spaces, respectively.

In this case, a plurality of cooling/heating units 60 or a plurality of engine rooms E may be used in combination with the above-described arrangement.

Constituent elements of the configuration of FIG. 4 corresponding to those of FIG. 2 are designated by the same reference numerals, respectively, and no description thereof will be given.

The above-described heat exchangers may have various heat transfer configurations, for example, a heat transfer configuration in which heat transfer is carried out through a thermal conductor, or a heat transfer configuration in which heat transfer is carried out through a fluid present in a heat exchanger, in accordance with the given design condition or the given requirement.

Hereinafter, operation of the cogeneration system according to the present invention will be described.

Electricity, which is generated by a driving force from the engine 50, may be used to operate electricity consuming elements such as the compressor 61 of the cooling/heating unit 60 and diverse controllers. Surplus electricity is also supplied to the heater H to heat the associated refrigerant line during a heating operation of the cogeneration system.

During the heating operation of the cogeneration system, a refrigerant flows through the compressor 61, the four-way valve 62, the first outdoor heat exchanger 63 serving as a condenser, the first expansion device 64, and the indoor heat exchanger 65 serving as an evaporator, in this order, and then sequentially flows through an accumulator 68 and the compressor 61 after again passing through the four-way valve 62, as in a general heat pump type refrigerant cycle.

On the other hand, during a cooling operation of the cogeneration system, the four-way valve 61 changes the refrigerant path, so that the refrigerant flows through the compressor 61, the four-way valve 62, the indoor heat exchanger 65 serving as a condenser while supplying hot air into a confined space, the second expansion device 71, the second outdoor heat exchanger 73, which is heated by waste heat of the engine 50, in this order, and then sequentially flows through the accumulator 68 and the compressor 61 after again passing through the four-way valve 62, as in a general heat pump type refrigerant cycle.

When a heating overload is generated during the heating operation, a part of the refrigerant emerging from the indoor heat exchanger 65 flows through the bypass line 77 in accordance with the operation of the valve 77V, so that the refrigerant is circulated through the refrigerant line 76 at the outlet side of the second outdoor heat exchanger 73 without passing through the second outdoor heat exchanger 73.

When it is determined that the ambient temperature around the second outdoor heat exchanger 73 is higher than the refrigerant evaporating temperature of the second outdoor heat exchanger 73, the refrigerant emerging from the second outdoor heat exchanger 73 passes through the first outdoor heat exchanger 63 via the refrigerant line 78 in accordance with the operation of the valve 78V, and then sequentially flows through the four-way valve 62 and compressor 61.

As apparent from the above description, the cogeneration system of the present invention includes a separate outdoor heat exchanger to receive waste heat from an engine during a heating operation, so that it is possible to maximize utilization of engine waste heat during the heating operation and to achieve an enhancement in heating performance.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
    an engine, which drives a generator to generate electricity;
    a cooling/heating unit comprising a heat pump type refrigerant cycle to circulate a refrigerant through in an order of at least one compressor, a four-way valve, a first outdoor heat exchanger, a first expansion device, and an indoor heat exchanger during a cooling operation of the cogeneration system; and
    a waste heat consuming heating unit comprising a refrigerant cycle to circulate the refrigerant through in an order of the compressor, the four-way valve, the indoor heat exchanger, a second expansion device, and a second outdoor heat exchanger to be heated by waste heat of the engine during a heating operation of the cogeneration system,
    wherein the waste heat consuming heating unit further comprises a refrigerant line and a bypass valve to selectively guide the refrigerant emerging from the second outdoor heat exchanger but before entering into the compressor to pass through the first outdoor heat exchanger during the heating operation of the cogeneration system.

2. A cogeneration system comprising:

an engine, which drives a generator to generate electricity;

a cooling/heating unit comprising a heat pump type refrigerant cycle to circulate a refrigerant through at least one compressor, a four-way valve, a first outdoor heat exchanger, a first expansion device, and an indoor heat exchanger, in this order, during a cooling operation of the cogeneration system; and a waste heat consuming heating unit comprising a refrigerant cycle to circulate the refrigerant through the compressor, the four-way valve, the indoor heat exchanger, a second expansion device, and a second outdoor heat exchanger to be heated by waste heat of the engine, in this order, during a heating operation of the cogeneration system, wherein the waste heat consuming heating unit further comprises:

a heater to heat the refrigerant circulated through the waste heat consuming heating unit, using the electricity generated from the engine.

3. The cogeneration system according to claim 1, wherein the waste heat consuming heating unit further comprises:

bypass means to cause a part of the refrigerant emerging from the indoor heat exchanger to flow without passing through the second outdoor heat exchanger.

4. The cogeneration system according to claim 1, wherein the second outdoor heat exchanger receives heat of cooling water used to cool the engine.

5. The cogeneration system according to claim 1, wherein the second outdoor heat exchanger receives heat of exhaust gas discharged from the engine.

6. The cogeneration system according to claim 1, further comprising:

a cooling water heat exchanger to recover heat of cooling water of the engine; and an exhaust gas heat exchanger to recover heat of exhaust gas of the engine, wherein the second outdoor heat exchanger receives heat from at least one of the cooling water heat exchanger and the exhaust gas heat exchanger.

7. The cogeneration system according to claim 1, wherein the engine, the second outdoor heat exchanger, and the second expansion device are arranged in an engine room.

8. The cogeneration system according to claim 1, wherein the compressor, the four-way valve, the first outdoor heat exchanger, and the first expansion device are arranged in an outdoor unit.

9. The cogeneration system according to claim 1, wherein each of the compressor, the indoor heat exchanger, the first outdoor heat exchanger, and the second outdoor heat exchanger comprises a plurality of ones, which are combined with the other ones of the compressor, the indoor heat exchanger, the first outdoor heat exchanger, and the second outdoor heat exchanger.

10. A cogeneration system comprising:

an engine, which drives a generator to generate electricity;

a cooling/heating unit comprising a heat pump type refrigerant cycle to circulate a refrigerant through in an order of at least one compressor, a four-way valve, a first outdoor heat exchanger, a first expansion device, and an indoor heat exchanger during a cooling operation of the cogeneration system; and a waste heat consuming heating unit comprising a refrigerant cycle to circulate the refrigerant through in an order of the compressor, the four-way valve, the indoor heat exchanger, a second expansion device, and a second outdoor heat exchanger to be heated by heat of cooling water of the engine or waste heat of the engine during a heating operation of the cogeneration system, and to guide a part of the refrigerant emerging from the indoor heat exchanger to be circulated without passing through the second outdoor heat exchanger and the first and second expansion devices before the part of the refrigerant emerging from the indoor heat exchanger enters into the compressor, when a heating overload is generated.

11. A cogeneration system comprising:

an engine, which drives a generator to generate electricity;

a cooling/heating unit comprising a heat pump type refrigerant cycle to circulate a refrigerant through at least one compressor, a four-way valve, a first outdoor heat exchanger, a first expansion device, and an indoor heat exchanger, in this order, during a cooling operation of the cogeneration system; and a waste heat consuming heating unit comprising a refrigerant cycle to circulate the refrigerant through the compressor, the four-way valve, the indoor heat exchanger, a second expansion device, and a second outdoor heat exchanger to be heated by heat of cooling water of the engine or waste heat of the engine, in this order, during a heating operation of the cogeneration system, and to guide a part of the refrigerant emerging from the indoor heat exchanger to be circulated without passing through the second outdoor heat exchanger when a heating overload is generated, wherein the waste heat consuming heating unit further comprises:

a heater to heat the refrigerant circulated through the waste heat consuming heating unit, using the electricity generated from the engine.

12. The cogeneration system according to claim 10, wherein the waste heat consuming heating unit further comprises:

a refrigerant line and a bypass valve to selectively guide the refrigerant emerging from the second outdoor heat exchanger before entering the compressor to pass through the first outdoor heat exchanger during the heating operation of the cogeneration system.

13. The cogeneration system according to claim 10, wherein the second outdoor heat exchanger receives heat of cooling water used to cool the engine.

14. The cogeneration system according to claim 10, wherein the second outdoor heat exchanger receives heat of exhaust gas discharged from the engine.

15. The cogeneration system according to claim 10, further comprising:

a cooling water heat exchanger to recover heat of cooling water of the engine; and an exhaust gas heat exchanger to recover heat of exhaust gas of the engine, wherein the second outdoor heat exchanger receives heat from at least one of the cooling water heat exchanger and the exhaust gas heat exchanger.

16. The cogeneration system according to claim 10, wherein the engine, the second outdoor heat exchanger, and the second expansion device are arranged in an engine room.

17. The cogeneration system according to claim 10, wherein the compressor, the four-way valve, the first outdoor heat exchanger, and the first expansion device are arranged in an outdoor unit.

18. The cogeneration system according to claim 10, wherein each of the compressor, the indoor heat exchanger, the first outdoor heat exchanger, and the second outdoor heat exchanger comprises a plurality of ones, which are combined with the other ones of the compressor, the indoor heat exchanger, the first outdoor heat exchanger, and the second outdoor heat exchanger.

19. A cogeneration system comprising:
an engine, which drives a generator to generate electricity;
a cooling/heating unit comprising a heat pump type refrigerant cycle to circulate a refrigerant through in an order of at least one compressor, a four-way valve, a first outdoor heat exchanger, a first expansion device, and an indoor heat exchanger during a cooling operation of the cogeneration system; and
a waste heat consuming heating unit comprising a refrigerant cycle to circulate the refrigerant through in an order of the compressor, the four-way valve, the indoor heat exchanger, a second expansion device, and a second outdoor heat exchanger to be heated by waste heat of the engine during a heating operation of the cogeneration system,
wherein the engine, the second outdoor heat exchanger, and the second expansion device are arranged in an engine room,
wherein the compressor, the four-way valve, the first outdoor heat exchanger, and the first expansion device are arranged in an outdoor unit.

20. The cogeneration system according to claim 1, wherein the bypass valve is open when an ambient temperature around the second outdoor heat exchanger is higher than a refrigerant evaporating temperature of the second outdoor heat exchanger, such that the refrigerant emerging from the second outdoor heat exchanger pass through the first outdoor heat exchanger via the refrigerant line of the waste heat consuming heating unit.

21. The cogeneration system according to claim 12, wherein the bypass valve is open when an ambient temperature around the second outdoor heat exchanger is higher than a refrigerant evaporating temperature of the second outdoor heat exchanger, such that the refrigerant emerging from the second outdoor heat exchanger pass through the first outdoor heat exchanger via the refrigerant line of the waste heat consuming heating unit.

22. The cogeneration system according to claim 19, wherein the engine room are outside of the outdoor unit.

* * * * *